United States Patent [19]
Bamford et al.

[11] Patent Number: 6,112,281
[45] Date of Patent: Aug. 29, 2000

[54] I/O FORWARDING IN A CACHE COHERENT SHARED DISK COMPUTER SYSTEM

[75] Inventors: Roger J. Bamford, Woodside; Boris Klots, Belmont, both of Calif.

[73] Assignee: Oracle Corporation, Redwood Shores, Calif.

[21] Appl. No.: 08/946,084

[22] Filed: Oct. 7, 1997

[51] Int. Cl.[7] .................................................. G06F 12/00
[52] U.S. Cl. .......................... 711/141; 711/147; 710/36; 709/213
[58] Field of Search .................................... 711/147, 141, 711/152, 163; 364/132, 134; 710/36; 709/213

[56] References Cited

U.S. PATENT DOCUMENTS 5,535,116   7/1996   Gupta et al. ............................. 364/134

FOREIGN PATENT DOCUMENTS 0 518 639 A2   12/1992   European Pat. Off. ........... G06F 9/46

OTHER PUBLICATIONS

Patterson, David A. and Hennessy, John L. Computer Architecture: A Quantitative Approach. Morgan Kaufmann Publishers, Inc. 1996.

J.B.Carter, J.K.Bennett, W.Zwaenepoel; Techniques for Reducing Consistency–Related Communication in Distributed Shared–Memory Systems; ACM Trans. on Comp. Systems, vol. 13, No. 3, Aug. 1995, 205–243.

M.D.Hill, J.R.Larus, Cache Considerations For Multiprocessor Programmers; Communications of the ACM, Aug. 1990, vol. 33, No. 8 pp. 97–108.

J.Archibald, J–LBaer; Cache Coherence Protocols: Evaluation Using A Multiprocessor Simulation Model ACM Transactions on Computer Systems, vol. 4, No. 4, Nov. 1986, pp. 273–298.

C.Mohan, I.Narang;—Efficient Locking and Caching of Data in the Multisystem Shared Disks Transaction Environment; Advances in Database Technology, Int'l Conference on Extending Database Technology Proceedings, Mar. 1992, pp. 453–468.

M.Feeley, W.Morgan, F.Pighin, A.Karlin, H.Levy; C.Thekkath;—Implementing Global Memory Management In A Workstation Cluster; ACM SIGOPS '95, Dec. 1995, pp. 201–212.

*Primary Examiner*—Eddie P. Chan
*Assistant Examiner*—Kevin Verbrugge
*Attorney, Agent, or Firm*—McDermott, Will & Emery

[57] ABSTRACT

A method and apparatus for I/O forwarding in a cache coherent shared disk computer system is provided. According to the method, a requesting node transmits a request for requested data to a managing node. The managing node receives the read request from the requesting node and grants a lock on the requested data. The managing node then forwards data that identifies the requested data to a disk controller. The disk controller receives the data that identifies the requested data from the managing node and reads a data item, based on the data that identifies the requested data, from a shared disk. After reading the data item from the shared disk, the disk controller transmits the data item to the requesting node. In one embodiment, an I/O destination handle is generated that identifies a read request and a buffer cache address to which the data item should be copied. The I/O destination handle is transmitted to the disk controller to facilitate transmission and processing of the data item from the disk controller to the requesting node. As a result of forwarding data that identifies the requested data directly from the managing node to the disk controller ("I/O forwarding"), the duration of a stall is reduced, contention on resources of the system is reduced and a context switch is eliminated.

27 Claims, 6 Drawing Sheets

I/O FORWARDING IN A CACHE COHERENT SHARED DISK COMPUTER SYSTEM

FIELD OF THE INVENTION

The present invention relates to shared disk computer systems, and more specifically to cache coherency management in a cache coherent shared disk computer system.

BACKGROUND OF THE INVENTION

In a cache coherent shared disk computer system, one or more persistent disks are shared among a plurality of nodes, where each node contains memory and one or more processors that share the memory. A portion of the memory of each node may be used as a "buffer cache" which temporarily stores disk resident data accessed by the processors of the node.

Because data on the disk is shared among nodes, the system needs to manage the shared data in a way that ensures each processor or device reading from or writing to the shared data does so in a way that preserves the data in a consistent state. Consider a situation where two nodes are executing separate processes that share a data item, where a copy of the data item currently resides in each node. If a first node modifies its copy of the data item and the second node is not notified of the modification, then the second node may supply an outdated version of the data item to its process, causing an error. However, if a resource management system is established that maintains the data item in a way that makes each copy of the data item appear to be a single, "consistent" data item (e.g., by updating or invalidating the data item in the second node in response to the update in the first node), then that data item is said to be in a "consistent" or "coherent" state.

Each buffer cache is managed by a cache coherency manager. The cache coherency manager for a given buffer cache controls access to the buffer cache and maintains the data in one or more buffer caches in a coherent, or consistent state. In addition, each buffer cache can create "locality", which will be explained in greater detail below.

A shared disk computer system is frequently employed in computing environments, such as database systems, where a number of users and processes may require access to a common database that is persistently stored on one or more shared disks.

FIG. 1 depicts a cache coherent shared disk computer system 100. In FIG. 1, a disk 150, comprising two data blocks 152 and 154, is connected to a disk controller 140 by a local bus 145. The disk controller 140, is connected to a first node 190 and a second node 192 by an I/O network 135.

First node 190 comprises a processor 102, a buffer cache 104 and a cache coherency manager 106. Buffer cache 104 has in it a copy of data block 154 (represented as a cached data block 154'). Processor 102, buffer cache 104 and cache coherency manager 106 are interconnected by a local bus 108.

Similarly, second node 192 comprises a processor 112, a buffer cache 114 and a cache coherency manager 116. Buffer cache 114 has in it a copy of data block 154 (represented as a cached data block 154'). Processor 112, buffer cache 114 and cache coherency managers 116 are interconnected by a local bus 118.

The first node 190 and the second node 192 in the cache coherent shared disk computer system depicted in FIG. 1 are interconnected by a system area network 130. For example, system area network 130 interconnects processors 102 and 112, as well as cache coherency managers 106 and 116.

Various configurations may be used to interconnect processor 102 to buffer cache 104 and a cache coherency manager 106 (e.g. local bus 108). Similarly, various configurations may be used to interconnect first node 190 to second node 192 (e.g. system area network 130). Likewise, various configurations may be used to connect first node 190, second node 192 and disk controller 140 (e.g. I/O network 135). The interconnection configurations shown in FIG. 1 are exemplary and are intended to simplify the description of a shared disk computer system.

Locality in a computer system takes a number of different forms, such as spatial locality, temporal locality and processor locality. Spatial locality is said to exist when contemporaneous memory references are likely to access adjacent or nearby memory addresses. Temporal locality is said to exist when a recent memory reference is likely to be accessed again. Further, parallel computing can create another form of locality called processor locality. Processor locality is said to exist when contemporaneous memory references are likely to come from a single multiprocessor (instead of many different ones).

The use of a buffer cache can create locality between the disk 150 and a process initiated in an interconnected processor by increasing the chances that data required by a processor in the future will be located near the processor. Using cache coherency manager 116, a local process initiated on processor 102 can exploit the temporal locality of accesses to cached data block 154' while it is in adjacent buffer cache 104, instead of being delayed by processing and communication latencies that would result from continually re-reading data block 154 from the disk 150.

In FIG. 1, each cache coherency manger maintains a data block from disk 150 in a consistent state by using a cache coherency protocol. The cache coherency protocol ensures that each processor 102 and 112 has access to a similar, or consistent copy of data block 154, even though the cached data block 154' is distributed in multiple buffer caches. For example, cache coherency manager 116 maintains data block 152 in a consistent state while a copy exists in buffer caches 104 and 114. Likewise, cache coherency manager 116 maintains data block 154 in a consistent state while it is distributed in buffer caches 104 and 114.

The cache coherency managers 106 and 116 in the shared disk computer system depicted in FIG. 1 help to create locality between a buffer caches 104 and 114, processors 102 and 112, and a data blocks 152 and 154 in disk 150.

CACHE COHERENCY MANAGEMENT

The communication sequence for a typical cache coherency management protocol is depicted in FIG. 2. Assume in FIG. 2 that a process, initiated by processor 102, has requested a read of data block 154. Additionally, assume that a copy of data block 154 is not presently cached in buffer cache 104. Further, assume that the cache coherency management system has chosen node 192 as the cache coherency manager for data block 154.

In order for the process to read data block 154, a copy of data block 154 must be placed in buffer cache 104. First, the first node 190 passes a lock request to the second node 192. Second node 192 receives the lock request from the first node 190 and, if a lock is available, passes a lock grant back to first node 190. First node 190 receives the lock grant and initiates a process that prepares buffer cache 104 for a copy of data block 154. First node 190 then passes a read request to disk controller 140. Next, disk controller 140 reads data block 154 from disk 150 and then sends a copy of data block 154 to first node 190. First node 190 receives the copy of data block 154 and then stores a copy of data block 154, as cached data block 154', into buffer cache 104.

A problem with the protocol described above is that the process on node 190 that requires data block 154 (the "requesting process") is stalled while waiting for a copy of data block 154. Stalling the requesting process under these conditions can lead to significant performance problems in an application program. Further, a synchronous context switch is required by first node 190 between path 2 and path 3. The problem described above is further exacerbated when large numbers of nodes have access to data on the same shared disk. For example, thousand nodes could share disk 150, disk 150 may have millions of data blocks and each node may request a thousand data blocks every minute. Under these conditions, communication latencies, processor stalls and context switches would comprise a significant amount of wasted processing time.

POSSIBLE SOLUTIONS

One approach to solving the problem of stalling a requesting process is addressed in Cache Considerations for Multiprocessor Programmers, M. D. Hill and J. R. Larus, *Communications of the ACM*, Vol. 33, No. 8, August 1990, p. 97–102. In their article, Hill and Larus suggest that the stalling problem can be at least partially mitigated by programming techniques that pay special attention to the buffer cache so as to avoid any extra accesses (reads) of the shared disk(s). Four memory models are proposed and rules are suggested for single processor and multiprocessor programming.

A problem with the Hill et al approach is that informed programming models may reduce the frequency of stalls, but they do not address the underlying problem, namely, the duration of the stalls.

Another approach is suggested in Techniques for Reducing Consistency-Related Communication in Distributed Shared-Memory Systems, J. B. Carter, J. K. Bennett and W. Zwaenepoel, *ACM Transactions on Computer Systems*, Vol. 13, No. 3, August 1995, p. 205–243. In their paper, Carter et al suggest that buffering and merging updates in a process will mask the latency of writes to a shared datum (i.e., the disk 150, or data block 154 distributed among buffer caches 104 and 114) and will effectively reduce the total overhead for update operations. The Carter et al approach is geared toward reducing the frequency of communication and, thereby, the frequency of the stalls. Whereas Carter et al's approach reduces the effective cost of the stall (if the stall is amortized over the number of "batched" updates), the individual cost of the stall is likely to be greater. For example, if a read request is needed immediately, then the Carter et al approach is insufficient because the duration of the stall is greater as result of queuing up the read requests until a sufficient number of requests are collected.

Thus, there is a need for an improved method and apparatus for implementing a cache coherent shared disk computer system.

SUMMARY OF THE INVENTION

A method and apparatus for I/O forwarding in a cache coherent shared disk computer system is provided.

According to the method, a requesting node transmits a request for requested data. A managing node receives the read request from the requesting node and grants a lock on the requested data The managing node then forwards data that identifies the requested data to a disk controller. The disk controller receives the data that identifies the requested data from the managing node and reads a data item, based on the data that identifies the requested data, from a shared disk. After reading the data item from the shared disk, the disk controller transmits the data item to the requesting node.

In one embodiment, an I/O destination handle is generated that identifies a read request and a buffer cache address to which the data item should be copied. The I/O destination handle is transmitted to the disk controller to facilitate transmission and processing of the data item from the disk controller to the requesting node.

As a result of forwarding data that identifies the requested data directly from the managing node to the disk controller ("I/O forwarding"), the duration of a stall is reduced, contention on resources of the system is reduced and a context switch is eliminated.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for I/O forwarding in a cache coherent shared disk computer system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
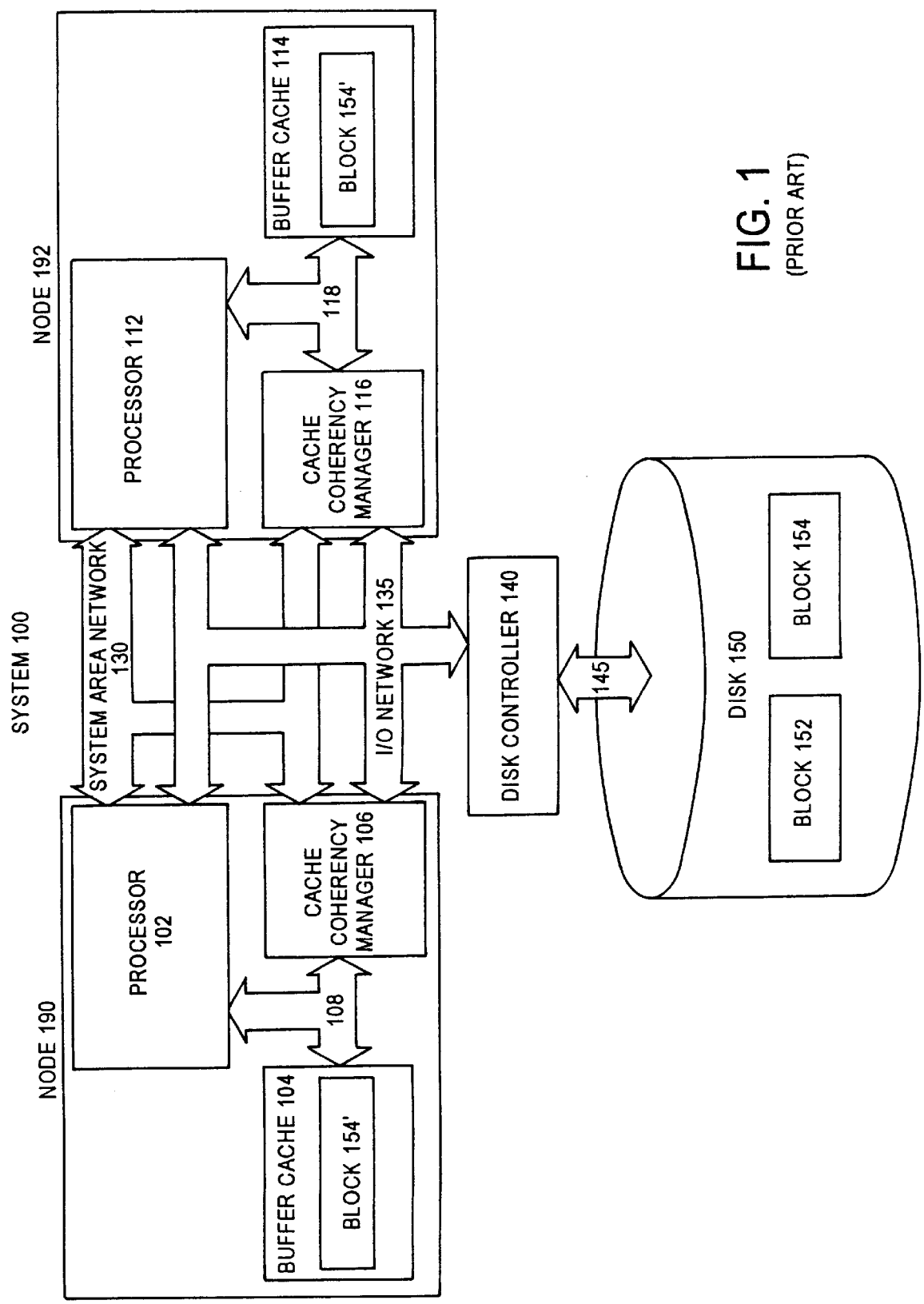
FIG. 1 is a block diagram of a conventional cache coherent shared disk computer system.
Figure 2:
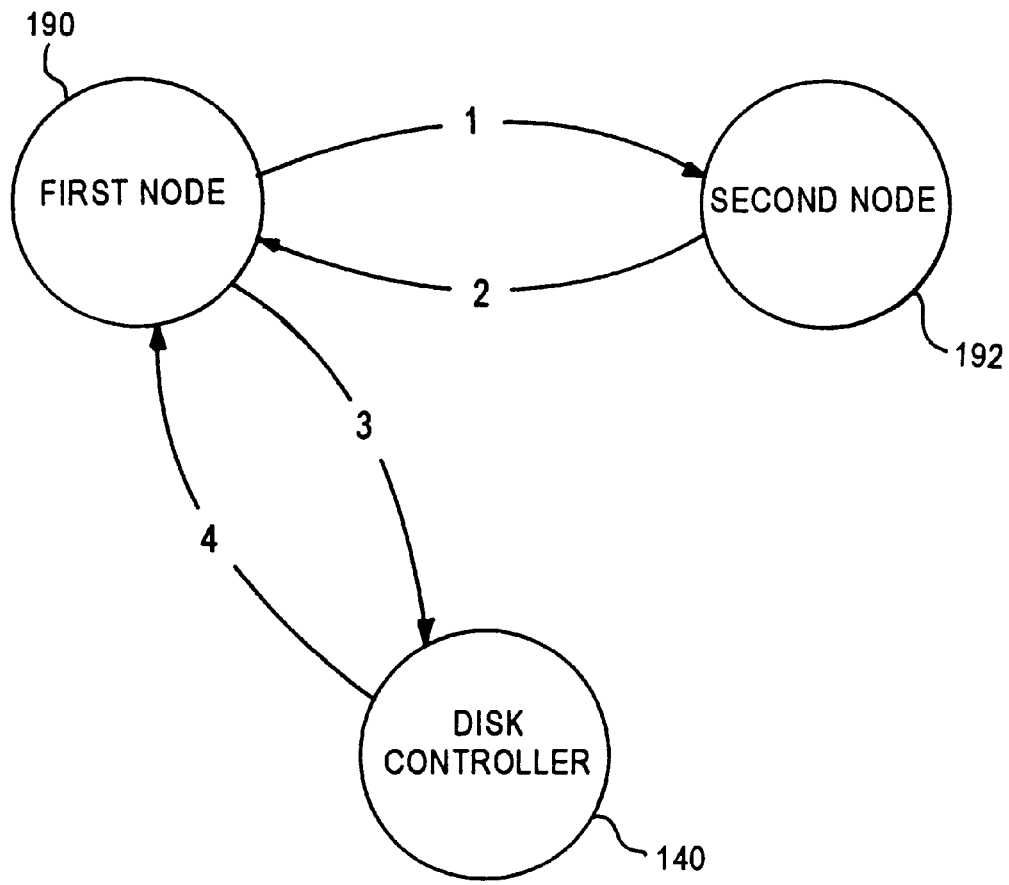
FIG. 2 is a flowchart illustrating the communication path for a conventional cache coherency protocol.
Figure 3:
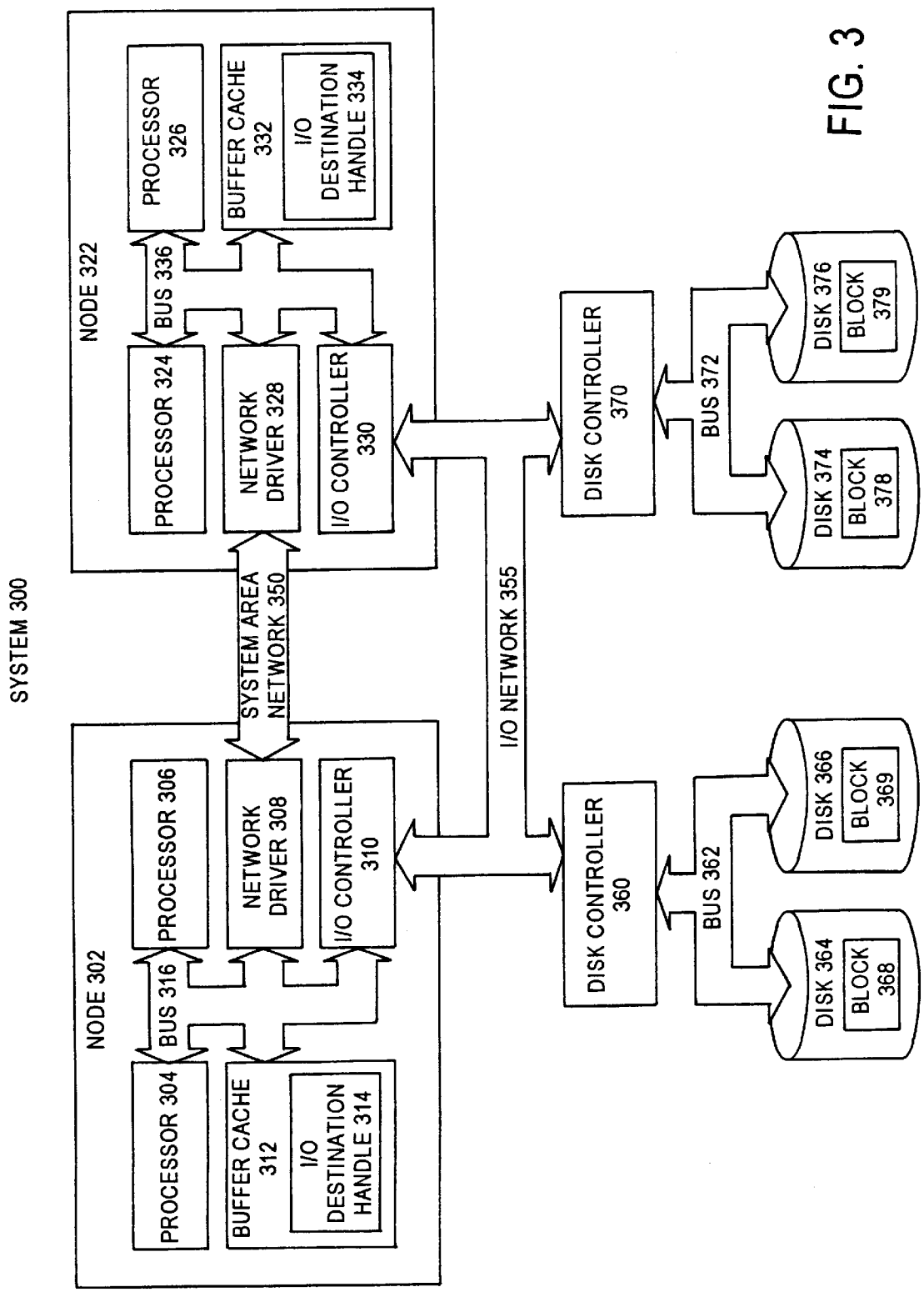
FIG. 3 is a block diagram of a cache coherent shared disk computer system according to an embodiment of the present invention.

FIG. 3 depicts a cache coherent shared disk computer system 300 according to an embodiment of the invention. First node 302 comprises processors 304 and 306, a network driver 308, an I/O controller 310 and a buffer cache 312. A local bus 316 interconnects processors 304 and 306, network driver 308, I/O controller 310 and buffer cache 312.

Second node 322 comprises processors 324 and 326, a network driver 328, an I/O controller 330 and a buffer cache 332. A local bus 336 interconnects processors 324 and 326, network driver 328, I/O controller 330 and buffer cache 332.

First node 302 is attached to second node 322 by a system area network 350 which interconnects network driver 308 to network driver 328. An I/O destination handle 314 in buffer cache 312 comprises data that identifies a destination memory address in buffer cache 312. Likewise, I/O destination handle 334 in buffer cache 332 comprises data that identifies a destination memory address in buffer cache 332.

System 300 comprises a disk controller 360. Disk controller 360 is attached to disk 364 and disk 366 by local bus 362. Similarly, disk controller 370 is attached to disk 374 and disk 376 by local bus 372. Disks 364, 366, 374 and 376 each contain a data block (368, 369, 378 and 379 respectively). Disk controllers 360 and 370 are connected by an I/O network 355. I/O network 355 also interconnects first node 302 and second node 322 via I/O controllers 310 and 330 respectively.

The task of cache coherency management in system 300 is a set of processes executed by the processors in each node. For example, processes executed by processors 304 and 306 in first node 302 manage data blocks 368 and 369. Likewise, processes executed by processors 324 and 326 in second node 322 manage data blocks 378 and 379.

Figure 4:
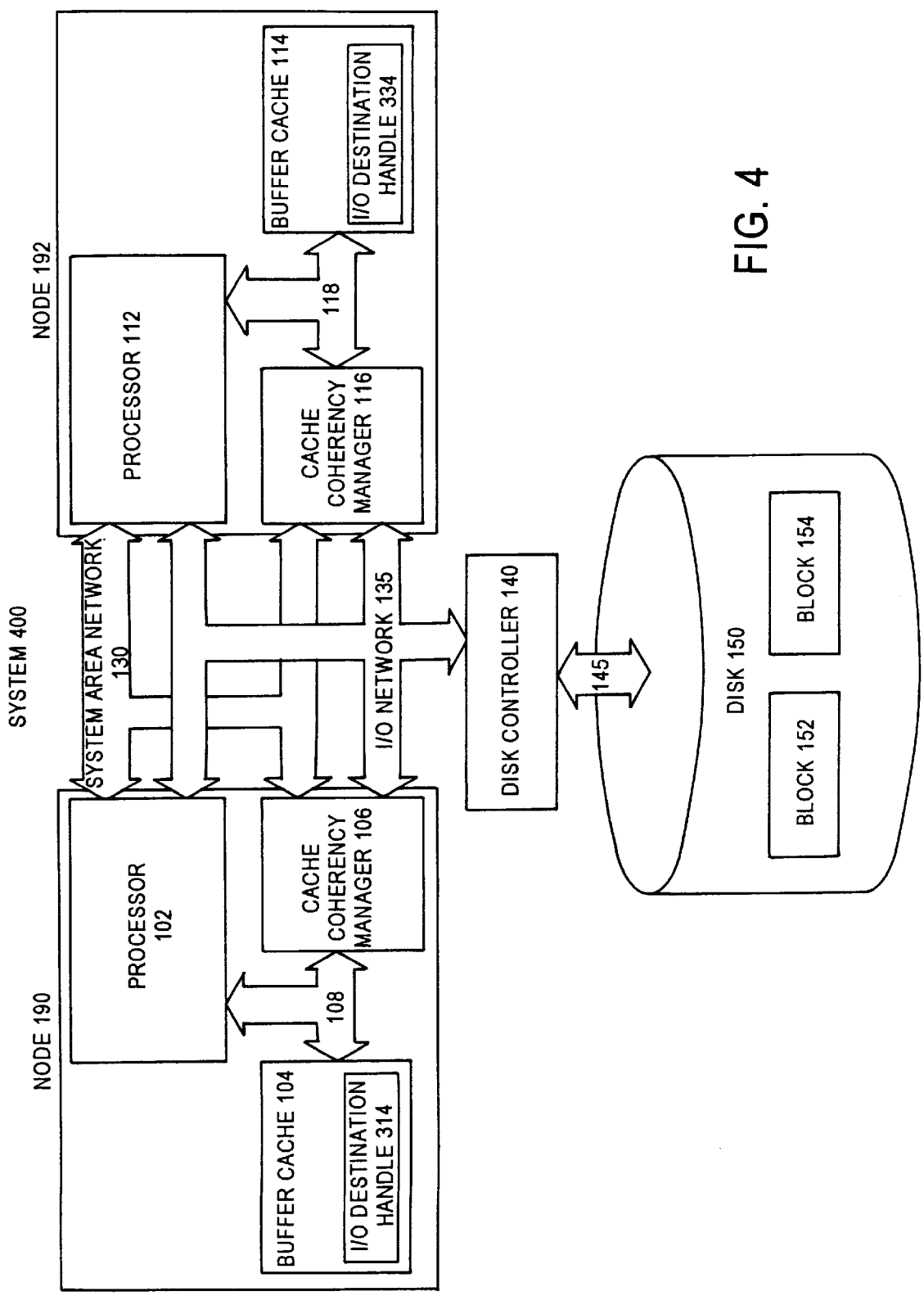
FIG. 4 is a block diagram of a cache coherent shared disk computer system according to an alternative embodiment of the present invention.

FIG. 4 depicts an alternative embodiment for a cache coherent shared disk computer system 400. In system 400, disk 150, comprising two data blocks 152 and 154, is interconnected to disk controller 140 by a local bus 145. The disk controller 140, is interconnected to a first node 190 and second node 192 by I/O network 135.

First node 190 comprises processor 102, buffer cache 104 and cache coherency manager 106. Buffer cache 104 has in it I/O destination handle 314. A local bus 108 interconnects processor 102, buffer cache 104 and cache coherency manager 106.

Similarly, second node 192 comprises processor 112, buffer cache 114 and cache coherency manager 116. Buffer cache 114 has in it I/O destination handle 334. A local bus 118 interconnects processor 112, buffer cache 114 and cache coherency manager 116.

Nodes in system 400 are interconnected by system area network 130. For example, first node 190 and second node 192 are attached by system area network 130 which interconnects to processors 102 and 112, as well as cache coherency managers 106 and 116.

Although similar to system 300, system 400 differs from system 300 in that system 300 is a software based cache coherency management system, meaning the cache coherency management is a series of processes executed by the processors associated with each node, whereas system 400 has dedicated hardware that is used expressly for cache coherency management.

In order to simplify the description that follows, the terms "requesting node" and "managing node" will be used interchangeably with the terms "first node" and "second node". "Requesting node" functionally identifies the node which has initiated a read request, whereas "managing node" functionally identifies the node which is responsible for the cache coherency management of the requested data item. However, it will be obvious to one skilled in the art that any node in the cache coherent shared disk computer system described herein could be a requesting node, or a sending node.

OPERATIONAL OVERVIEW

According to one embodiment of the invention, a process, executing in a requesting node, allocates memory to receive a data item before requesting the data item. Next, the requesting node sends data that identifies the location of the allocated memory ("I/O destination handle") with the request for the data item to the node that manages the requested data item. The managing node then causes the disk containing the data item to send the data item directly to the location identified by the I/O destination handle.

In one embodiment, the requesting node transforms a logical address of the requested data item (e.g. a resource name) into a physical address of the requested data item. In another embodiment, the managing node transforms the logical address of the requested data item to the physical address. In still another embodiment, both the requesting node and the managing node transform the logical address of the requested data item to the physical address. In yet another embodiment, the disk controller transforms the logical address to the physical address. In any of the above embodiments, the step of transforming could be initiated by an operating system call, an I/O subsystem call or another process.

GENERATING AN I/O DESTINATION HANDLE

I/O destination handles 314 and 334, depicted in FIG. 3 and FIG. 4, each comprise data that identifies the destination memory address for a requested data block in the buffer cache (e.g. buffer caches 312, 332, 104 or 114) to which a data block is to be copied. For example, I/O destination handle 314 could identify requesting node 302 and the destination memory address E200 F000 in buffer cache 312, with the data "0001E200F000". In the previous example, the first two bytes identify the requesting node and the next four bytes identify the specific memory address.

In an alternative embodiment, the I/O destination handles 314 and 334 comprise the destination memory address and status information. The status information can comprise a time stamp or other information used to uniquely identify a particular I/O request. For example, the previous I/O destination handle 314, "0001E200F000", can have appended to the end of it the three bytes "2A0234" to represent a point in time or a sequence number for the read request. In addition, the I/O destination handle can comprise a checksum to verify the authenticity or accuracy of the I/O destination handle.

According to one embodiment, the I/O destination handles 314 and 334 are generated by an operating system call or an I/O subsystem call. In one embodiment, generation of an I/O destination handle is implicitly performed upon the occurrence of an event. In another embodiment, generation of the I/O destination handle is explicitly performed by a function call. For example, if a process is initiated on processor 304 and the process requests to read data block 379, then the read request in the process triggers an operating system call that generates I/O destination handle 314 for a particular destination memory address in buffer cache 312.

In an alternative embodiment, the I/O destination handle (e.g. I/O destination handle 314) is generated by a local device responsible for the cache coherency management (e.g., cache coherency manager 106 or processor 304). The local device would make an operating system call or an I/O subsystem call that is either explicit or implicit in the read request. The I/O destination handle could have data (e.g. status information) appended and removed as it passes the managing node and disk controller.

In another embodiment, a bank of p memory addresses, where p is the result of the amount of memory reserved for data blocks in buffer cache (e.g. buffer cache 312) divided by a maximum size of a data block (e.g. data block 379), can be used to generate the I/O destination handle. The I/O destination handle would point to a block of memory in the buffer cache of a particular size (at least the size of a data block). When the I/O destination handle is generated, it is selected from the bank of p memory addresses which do not correspond to an outstanding I/O request. A status flag can be used to identify outstanding or currently unallocated memory addresses in the bank of p memory addresses. In this way, upon arrival of a data block with a particular I/O destination handle, the data block can be copied into the appropriate location in buffer cache. When the process that initiated the read request is fished, the memory address would be returned to the bank of available memory addresses.

I/O FORWARDING

Figure 5:
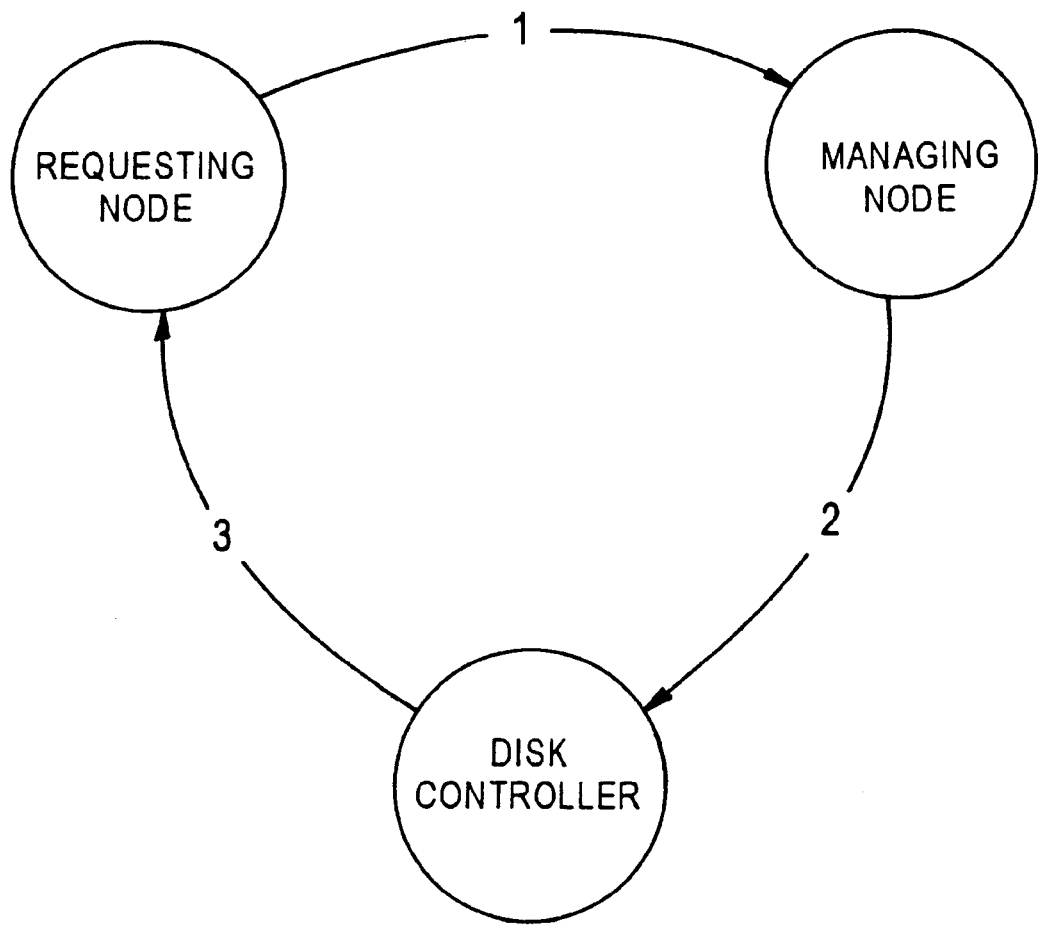
FIG. 5 is a flow diagram illustrating the communication path for a cache coherency protocol according to an embodiment of the present invention.

Referring to the communication flow diagram depicted in FIG. 5, a first message, comprising a request for data, is passed from a requesting node that is executing the requesting process to a managing node that is responsible for managing the requested data. The managing node receives the first message from the requesting node and grants a lock for the requested data to the requesting node. The managing node forwards a second message to a disk controller. The disk controller receives the second message and then copies the requested data from a shared disk to the location in the requesting node that is identified by the I/O destination handle.

The I/O destination handle can be appended to the requested data, or it may be sent separately from the requested data. In one embodiment, the I/O destination handle is appended to the I/O request from the requesting node to the managing node and is sent separate from the I/O request from the managing node to the disk controller.

According to another embodiment, an I/O destination handle uniquely identifies an outstanding read request, so when the requested data arrives at the requesting node from the disk controller and is addressed to a specific memory location in the buffer cache, the fact that the requested data has arrived is an indication that the lock request was granted. Thus, sending the lock grant in the communication from the disk controller to the requesting node is not necessary. In an alternative embodiment, if the lock grant is required by the requesting node, then the managing node can send the lock grant back to the requesting node (separate from forwarding the I/O request), or the disk controller can send the lock grant to the requesting node.

EXAMPLE

Figure 6:
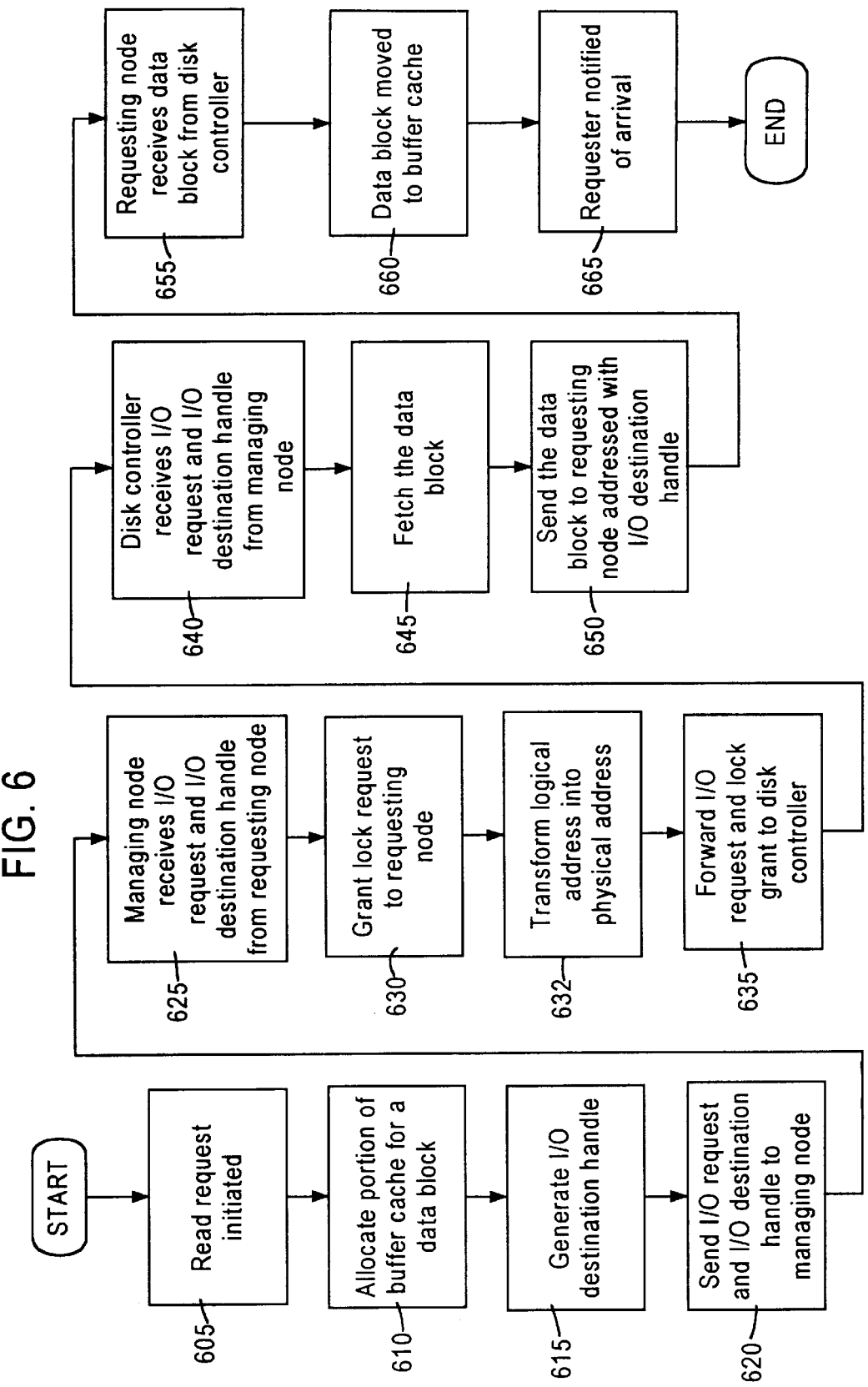
FIG. 6 is a flow chart depicting the steps for handling a request for data according to an embodiment of the present invention.

Referring to FIG. 3 and FIG. 6, consider a situation where a process initiated by processor 304 on the requesting node 302, requests data block 379, which is on disk 376 (step 605). As mentioned above, data block 379 is managed by processes executing on processors 324 and 326 in the managing node 322.

In step 610, processor 304 allocates a portion of buffer cache 312 for receipt of data block 379. In step 615, an I/O destination handle 314 is generated by an operating system call in requesting node 302. The I/O destination handle identifies the portion of buffer cache 312 allocated for data block 379 in step 610. Next, in step 620, an I/O request comprising a lock request, a read request and an I/O destination handle 314 is sent to the managing node 322 from requesting node 302 by network driver 308.

In step 625, network driver 328 in managing node 322 receives the I/O request from network driver 308 in the requesting node 302. Assume processor 324 in managing node 322 is not busy and processor 326 is busy. (If both processors were busy, then one of the processors, usually a preset default processor in managing node 322, would be assigned the task of processing the I/O request.) Processor 324 in managing node 322 grants the lock request to the requesting node 302 in step 630, and, in step 632, managing node 322 transforms a logical address of the requested data into a physical address. (The physical address will be sent with the I/O request, rather than the logical address.) Next, in step 635, the managing node 322, via I/O controller 330, forwards the I/O request to the disk controller 370. In some configurations of I/O network 355, the I/O request may be broken up and the I/O destination handle 314 may be sent in a separate message.

In step 640, the disk controller 370 receives the I/O request (and the I/O destination handle 314) from I/O controller 330 in managing node 322. Next, in step 645 disk controller 370 processes the I/O request by fetching data block 379. In step 650, disk controller 370 sends data block 379, addressed to buffer cache 312 in requesting node 302, with I/O destination handle 314.

In step 655, I/O controller 310 in requesting node 302 receives the data block 379. The data block 379 is processed by I/O controller 310, at step 660, which moves the data block 379 into buffer cache 312, at the address identified by I/O destination handle 314. Processor 304, which initiated the I/O request, is notified of the arrival of data block 379 by I/O controller 310 in step 665 and the process completes.

Note, in the embodiment described above, that arrival of the data block 379 implies that the lock request generated by requesting node 302 was granted. However, in alternative embodiments, the lock grant could be explicitly given to requesting node 302 by disk controller 370 or by managing node 322.

In the foregoing specification, the invention has been described with reference to specific embodiments thereof. It will, however, be evident that various modifications and changes may be made thereto without departing from the broader spirit and scope of the invention. For example, the I/O request described herein may comprise additional information such as network and protocol headers, checksums and state information specific to the particular cache coherency protocol implemented. In addition, the I/O destination handle could comprise more or less than the number of bytes specified above to identify a variable amount of nodes, a variable length address space (e.g., 16, 48 or 64 bit addresses) in the buffer cache or a variable length time stamp or sequence number. Further, two cache coherent shared disk computer systems with specific configurations were described for purposes of illustration. It would be apparent that other configurations of cache coherent shared disk computer systems would also benefit from I/O forwarding (such as a system employing shared memory parallel processors). The specification and drawings are, accordingly, to be regarded in an illustrative rather than a restrictive sense.

What is claimed is:

1. A method for managing access to data in a multiple-node computer system, comprising the steps of:

assigning to a first node, selected from a plurality of nodes that have access to non-volatile memory that stores a particular data item, responsibility for ensuring that each entity that accesses the particular data item does so in a way that preserves the particular data item in a consistent state;

wherein each node of said plurality of nodes includes volatile memory and one or more processors that have access to the volatile memory;

said first node receiving a read request for said particular data item, said read request being initiated at a second node of said plurality of nodes;

said first node granting a lock on said particular data item that permits said second node to read said particular data item;

said first node forwarding a second message that identifies said particular data item to a disk controller that controls the non-volatile memory that stores said particular data item;

said disk controller receiving said second message that identifies said particular data item from said node;

in response to said second message, said disk controller performing the steps of reading said particular data item from said non-volatile memory; and transmitting said particular data item in a data item return path that delivers the particular data item to said second node without the particular data item being processed by the first node.

2. The method of claim 1, further comprising the step of the second node generating destination data that indicates a location at which said particular data item is to be stored in the volatile memory that belongs to said second node.

3. The method of claim 2, further comprising the steps of:

said first node receiving said destination data from said second node;

said first node forwarding said destination data to said disk controller; and said disk controller delivering said particular data item to said location in the volatile memory of said second node.

4. The method of claim 1, further comprising the steps of:

generating destination data that uniquely identifies said read request; and when the particular data item arrives at the second node from the disk controller, the second node inspecting said destination data to determine that the lock was granted.

5. The method of claim 1, further comprising the step of said second node allocating a portion of a buffer cache to receive said particular data item before transmitting said read request and without having been granted the lock for said particular data item, wherein said buffer cache resides in the volatile memory that belongs to said second node.

6. The method of claim 1 wherein said data item return path completely bypasses said first node.

7. The method of claim 1 wherein the read request is sent over a first communication network and said disk controller transmits said particular data item over a second communication network.

8. An apparatus comprising:

a non-volatile memory comprising a data block;

a disk controller, coupled to said non-volatile memory, configured to respond to a send-message from a first node by sending said data block in a data item return path that delivers the data block to a second node without the data block being processed by the first node;

said second node, coupled to said disk controller and configured to send a request-message for said data block to said first node, wherein said second node comprises:

a first processor; and a first buffer cache coupled to said first processor; and said first node, coupled to said disk controller and said second node, configured to receive said request-message from said second node and, in response to said request-message, forward said send-message based on said request-message to said disk controller, wherein said first node comprises a second processor.

9. The apparatus of claim 8, wherein said second node is configured to generate destination data that indicates a location at which said particular data block is to be stored within said second node.

10. The apparatus of claim 9, wherein said first node is configured to receive said destination data and forward the destination data to the disk controller.

11. The apparatus of claim 8, wherein said second node is configured to generate destination data that uniquely identifies said request-message, said destination data is sent to the first node, the first node forwards the destination data to the disk controller, and the disk controller sends the destination data back to the second node.

12. The apparatus of claim 8, wherein said second node is configured to allocate a portion of said first buffer cache to receive said data block before transmitting said request-message.

13. The apparatus of claim 8 wherein:

said request-message requests permission to access said data block; and said first node grants to said second node permission to access said data block in response to said request-message from said second node.

14. The apparatus of claim 8 wherein the disk controller is configured to send said data block in a data item return path that completely bypasses said first node.

15. The apparatus of claim 8 wherein the request-message is sent over a first communication network and said disk controller transmits said particular data item over a second communication network.

16. A computer readable medium having stored thereon a series of instructions for accessing data in a multiple-node computer system, said series of instructions comprising instructions for performing the steps of:

assigning to a first node, selected from a plurality of nodes that have access to non-volatile memory that stores a particular data item, responsibility for ensuring that each entity that accesses the particular data item does so in a way that preserves the particular data item in a consistent state;

wherein each node of said plurality of nodes includes volatile memory and one or more processors that have access to the volatile memory;

said first node receiving a read request for said particular data item, said read request being initiated at a second node of said plurality of nodes;

said first node granting a lock on said particular data item that permits said second node to read said particular data item;

said first node forwarding a send-message that identifies said particular data item to a disk controller that controls the non-volatile memory that stores said particular data item;

said disk controller receiving said send-message that identifies said particular data item from said first node;

in response to said send-message, said disk controller performing the steps of reading said particular data item from said non-volatile memory; and transmitting said particular data item in a data item return path that delivers the particular data item to said second node without the particular data item being processed by the first node.

17. The computer readable medium of claim 16, further comprising instructions for performing the step of the second node generating destination data that indicates a location at which said particular data item is to be stored in the volatile memory that belongs to said second node.

18. The computer readable medium of claim 17, further comprising instructions for performing the steps of:

said first node receiving said destination data from said second node;

said first node forwarding said destination data to said disk controller; and said disk controller delivering said particular data item to said location in the volatile memory of said second node.

19. The computer readable medium of claim 16, further comprising instructions for performing the steps of:

generating destination data that uniquely identifies said read request; and when the particular data item arrives at the second node from the disk controller, the second node inspecting said destination data to determine that the lock was granted.

20. The computer readable medium of claim 16, further comprising instructions for performing the step of said second node allocating a portion of a buffer cache to receive said particular data item before transmitting said read request and without having been granted the lock for said particular data item, wherein said buffer cache resides in the volatile memory that belongs to said second node.

21. The computer readable medium of claim 16 wherein said data item return path completely bypasses said first node.

22. The computer readable medium of claim 16 wherein the read request is sent over a first communication network and said disk controller transmits said particular data item over a second communication network.

23. A method for accessing data in a multiple-node computer system comprising:

sending an access request for a data item from a first node to a second node, wherein the data item resides on non-volatile memory to which both the first node and the second node have access;

receiving said access request at said second node;

in response to said access request, said second node granting said first node permission to access said data item;

forwarding data corresponding to said access request from said second node to a disk controller;

receiving said data corresponding to said access request at said disk controller;

in response to said disk controller receiving said data corresponding to said access request, reading said data item, by way of said disk controller, from said non-volatile memory; and transmitting said data item, by way of said disk controller, to said first node, in a data item return path that bypasses said second node.

24. The method of claim 23, further comprising the steps of:

generating destination data that indicates a buffer cache location at which said requested data is to be stored in said first node;

receiving said destination data at said second node; and forwarding said destination data from said second node to said disk controller.

25. The method of claim 23, further comprising the step of generating destination data that uniquely identifies said access request, said step of generating performed by said first node, wherein said destination data is sent from said first node to said second node, wherein said destination data is forwarded from said second node to said disk controller, wherein said destination data is sent from which disk controller to said first node to indicate to said first node which access request, from a plurality of outstanding access requests, is being serviced by said disk controller.

26. The method of claim 23, wherein the second node does not directly communicate to said first node that said first node has been granted permission to access said data item.

27. The method of claim 23, wherein said access request for said data item is sent by said first node over a first communication network, and wherein said data item is transmitted from said disk controller to said first node over a second communication network.

* * * * *